United States Patent
Zheng et al.

(10) Patent No.: US 11,075,584 B2
(45) Date of Patent: Jul. 27, 2021

(54) INPUT VOLTAGE DETECTION FOR FLYBACK CONVERTER

(71) Applicants: DIALOG SEMICONDUCTOR INC., Campbell, CA (US); DIALOG SEMICONDUCTOR (UK) LIMITED, London (GB)

(72) Inventors: Jun Zheng, Shenzhen (CN); Jianming Yao, Campbell, CA (US); Yimin Chen, Campbell, CA (US); Huaming Guo, Shenzhen (CN); Zhaowu Luo, Shenzhen (CN)

(73) Assignees: Dialog Semiconductor Inc., Campbell, CA (US); Dialog Semiconductor (UK) Limited, London (GB)

( * ) Notice: Subject to any disclaimer, the term of this patent is extended or adjusted under 35 U.S.C. 154(b) by 445 days.

(21) Appl. No.: 15/809,682

(22) Filed: Nov. 10, 2017

(65) Prior Publication Data
US 2019/0149056 A1  May 16, 2019

(51) Int. Cl.
| H02M 3/335 | (2006.01) |
| H02J 7/00 | (2006.01) |
| H02M 1/36 | (2007.01) |
| H02M 1/32 | (2007.01) |

(52) U.S. Cl.
CPC .......... *H02M 3/33592* (2013.01); *H02J 7/00* (2013.01); *H02J 7/0036* (2013.01); *H02J 7/0072* (2013.01); *H02M 1/32* (2013.01); *H02M 1/36* (2013.01)

(58) Field of Classification Search
None
See application file for complete search history.

(56) References Cited

U.S. PATENT DOCUMENTS

| 2015/0311806 A1* | 10/2015 | Kim | ............... | H02M 3/33507 363/21.17 |
| 2016/0301314 A1* | 10/2016 | Polivka | ............ | H02M 3/33507 |
| 2017/0194805 A1* | 7/2017 | Kong | ................... | H02J 7/0027 |

\* cited by examiner

*Primary Examiner* — Jeffrey A Gblende
*Assistant Examiner* — Henry E Lee, III
(74) *Attorney, Agent, or Firm* — Haynes and Boone, LLP

(57) ABSTRACT

A switch detection circuit is provided that senses the voltage on a rectifying component for rectifying a secondary winding current through a secondary winding of a flyback converter's transformer to determine whether a power switch transistor attached to a primary winding of the transformer has ceased cycling.

12 Claims, 4 Drawing Sheets

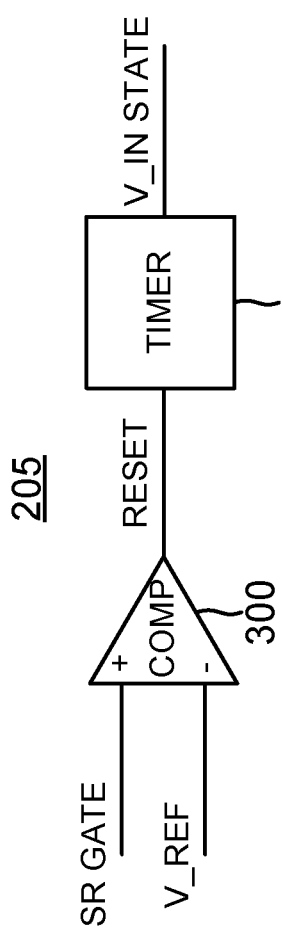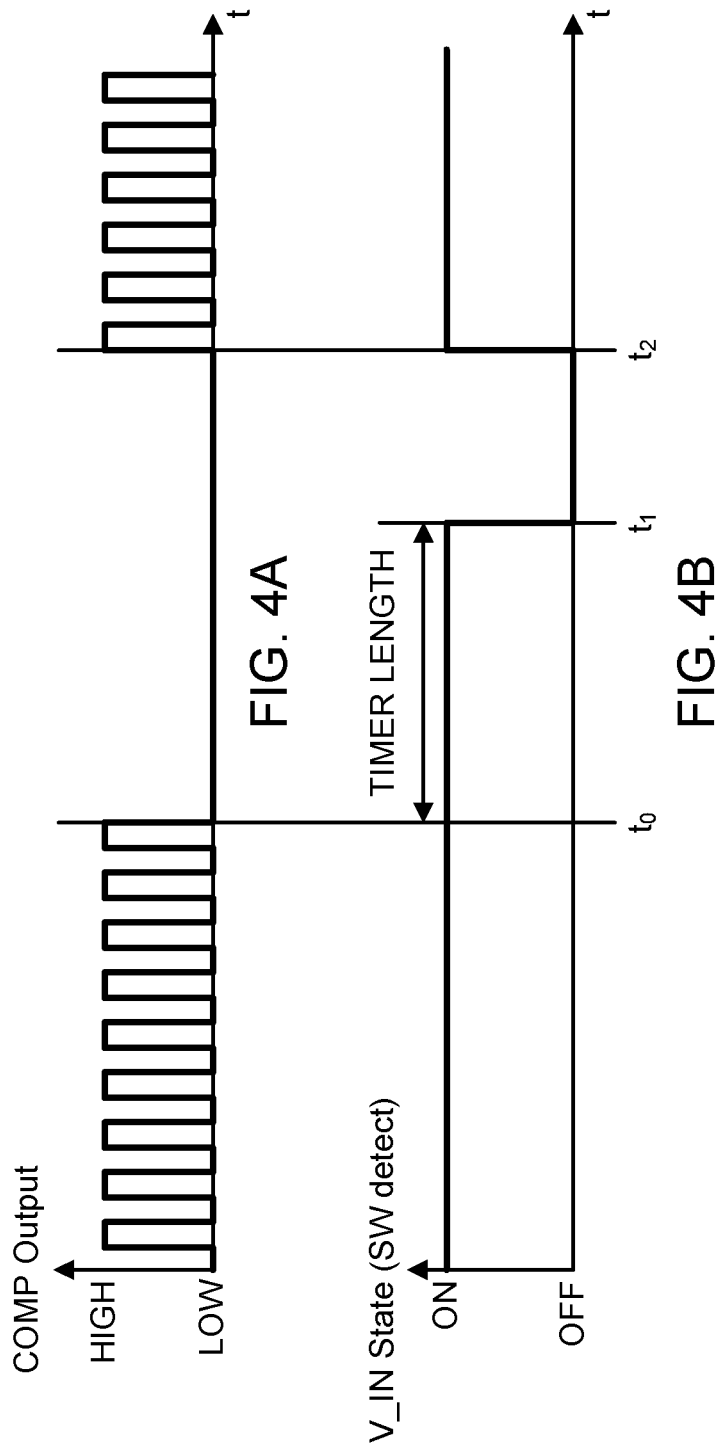

INPUT VOLTAGE DETECTION FOR FLYBACK CONVERTER

TECHNICAL FIELD

This application relates to power converters, and more particularly to a switching power converter configured to detect a soft short condition while charging a battery-powered device through a data interface cable.

BACKGROUND

A flyback converter is commonly provided with the sale of a battery-powered device such as a smartphone or tablet because the transformer in a flyback converter provides a safe isolation of the device being charged from the AC mains. The flyback converter includes a power switch connected to the primary winding of the transformer. A primary-side controller controls the switching of the power switch to regulate the power delivery from the secondary winding over a data cable such as a Universal Serial Bus (USB) to the battery-powered device (e.g., a mobile device) so that the mobile device's battery may be charged. But the charging of a battery such as a lithium battery requires a specific constant voltage or constant current regulation to prevent damage to the battery.

In particular, the charging of a discharged battery typically proceeds over three phases. In a first phase, the battery voltage is low such that the charging occurs in a constant-current mode that drives the battery with the maximum allowable current over the USB cable (e.g., 4 A). The discharged battery's voltage gradually rises over the first phase until it reaches a battery voltage limit such as 4.3 V. The battery charging then enters a second phase involving a series of alternating constant-current mode and constant-voltage modes in which the current limit is successively decreased in steps from the USB current limit to a reduced minimum current such as 2A. With each reduction in the current limit, the battery voltage first drops and then increases until it reaches the voltage maximum, whereupon a lower current limit is enforced. When the battery voltage again reaches the voltage maximum with the current limit at the minimum limit for the second phase, the battery charging procedure enters into a third phase of constant voltage operation at the voltage maximum. The current slowly decreases during the third phase until the battery is fully charged.

Given the high cost of advanced smartphones, it is critical that the proper charging procedure with regard to the current and voltage limits over the various constant current and constant voltage modes of regulation since the battery is typically non-removable. So if the battery is ruined, the entire smartphone is destroyed. It is thus conventional that a smartphone or other modern mobile device includes a battery charging and management system including a DC-to-DC switching power converter (e.g., a buck converter) that intervenes between the power delivery from the flyback converter and the battery. However, smartphone and tablet manufacturers are constantly striving to reduce the profile and cost of their devices so that it is now conventional for some mobile devices to be charged by the flyback converter in a "direct charge" mode of operation in which the battery charging and management system is absent or bypassed. In such a case, the flyback converter must control its power regulation to provide the appropriate voltage and current limits during the battery charging phases.

An example direct charge flyback converter 100 is shown in FIG. 1 that charges a mobile device 105 over a USB cable through a USB interface. In the case of a USB type C interconnect, the USB interface includes a CC1 pin and a CC2 pin that are monitored by a controller U3 for detecting whether the mobile device 105 and flyback converter 100 are connected over the USB cable. Flyback converter 100 includes a transformer T1 having a primary winding connected to a power switch transistor S1. A primary-side controller U1 controls the cycling of power switch transistor S1 to regulate the power deliver to mobile device 105. While the primary current flows through the power switch transistor S1, a synchronous rectifier (SR) switch transistor S2 is switched off by a synchronous rectifier controller U2 to prevent the secondary winding from conducting current. When the power switch transistor S1 is cycled off, synchronous rectifier controller U2 switches on SR switch transistor S2 so that the secondary winding current may flow to deliver power to the load.

The output voltage driven over the Vbus pin or terminal in the USB interface is smoothed by an output capacitor C1. Controller U3 includes a Vdd pin for receiving its power supply voltage Vdd by tapping off the regulated output voltage rail that connects to the secondary winding. In addition, controller U3 controls a switch S3 that isolates the regulated output voltage rail from the Vbus terminal when switch S3 is switched off. During normal operation, switch S3 is on so that power delivery can occur. But note that controller U3 is on the secondary side of transformer T1 and is thus isolated from the cycling of power switch transistor S1. It may thus be the case that a user has disconnected the flyback converter (unplugged it from the AC mains) so that the power switch transistor S1 stops cycling and delivering power to the load. But controller U3 is monitoring the CC1 and CC2 pins, which indicate that the mobile device is still connected to the USB cable such that controller U3 maintains switch S3 on despite the lack of power delivery. Mobile device 105 includes a battery charging and management system 110 including a DC-to-DC switching power converter (e.g., a buck converter) that intervenes between the power delivery from the flyback converter and a battery 115. But in a direct charging mode of operation, mobile device 105 can bypass battery charging and management system 110 by closing a bypass or load switch (Load SW) so that flyback converter 100 can directly charge battery 115. The output current can thus reverse with the collapse of the power delivery due to the non-cycling of power switch transistor S1 such that an undesirable discharge occurs from battery 115 into output capacitor C1 and also into the Vdd terminal of controller U3 as shown by discharge path 120.

But an even more severe problem besides such an unwanted battery discharge can occur should a user disconnect flyback converter 100 from the AC mains. For example, it may be the case that battery 115 may have been nearly fully charged and also that the user re-plugs flyback converter 100 back into the AC mains. Primary-side controller U1 will then go through a power-on reset procedure in which it develops its power supply voltage to an operating level, whereupon it begins to cycle power switch S1 at a default start-up level so as to deliver a default start-up current such as 3A to battery 115. Such a large amount of current with battery 115 nearly completely charged can damage battery 115.

Accordingly, there is a need in the art for improved flyback converters that can prevent battery discharge or damage in response to a disconnect from the AC mains during a direct charge mode of operation.

SUMMARY

To prevent battery damage or discharge during a direct charge mode of operation while a flyback converter is disconnected from the AC mains, a secondary-side switch detection circuit is provided that indirectly detects whether a power switch is cycling. This indirect detection varies depending upon whether synchronous rectification is employed. In a synchronous rectifier embodiment, the switch detection circuit monitors whether a synchronous rectifier switch is cycling as a proxy for detecting the cycling of the power switch. In an embodiment without synchronous rectification, the switch detection circuit may instead monitor the voltage across an output diode as the proxy for detecting the cycling of the power switch.

The switch detection circuit may be integrated with a secondary-side controller that monitors a data cable through which the flyback converter charges the battery of a mobile device. Should the secondary-side controller detect that the mobile device is connected to the flyback converter through the data cable and should the switch detection circuit detect a lack of cycling of the power switch, the secondary-side controller opens a voltage bus switch to disconnect the flyback converter from an output voltage lead in the data cable. The opening of the voltage bus switch prevents a battery discharge or damage in the mobile device during direct charge modes of operation while the flyback converter is disconnected from the AC mains.

These advantageous features may be better appreciated from the detailed description below.

BRIEF DESCRIPTION OF THE DRAWINGS

FIG. 3 illustrates the switch detection circuit in the flyback converter of FIG. 2 in accordance with an aspect of the disclosure.

FIG. 4A illustrates a comparator output signal waveform for the switch detection circuit of FIG. 3.

FIG. 4B illustrates the output voltage bus switch state in response to the comparator output signal waveform of FIG. 4A.

Embodiments of the present disclosure and their advantages are best understood by referring to the detailed description that follows. It should be appreciated that like reference numerals are used to identify like elements illustrated in one or more of the figures.

DETAILED DESCRIPTION

A secondary-side flyback converter controller is provided that indirectly senses whether the power switch transistor on the primary side of the flyback converter's transformer is cycling. The secondary-side controller is also configured to detect whether a mobile device has connected to the flyback converter through a data cable. The following discussion will assume that the data cable is a USB cable but it will be appreciated that the techniques and systems disclosed herein are applicable to the charging of mobile devices through other types of data cables such as the Apple Lightning cable. Should the secondary-side controller sense that it is connected to the mobile device through the data cable and that the power switch transistor is not cycling, the secondary-side controller switches off a switch transistor to disconnect its regulated output voltage rail from the power delivery terminal in the data cable. The problems of battery discharge and potential battery damage during direct charge modes of operation when the flyback converter is disconnected from the AC mains are thus eliminated.

Figure 2:
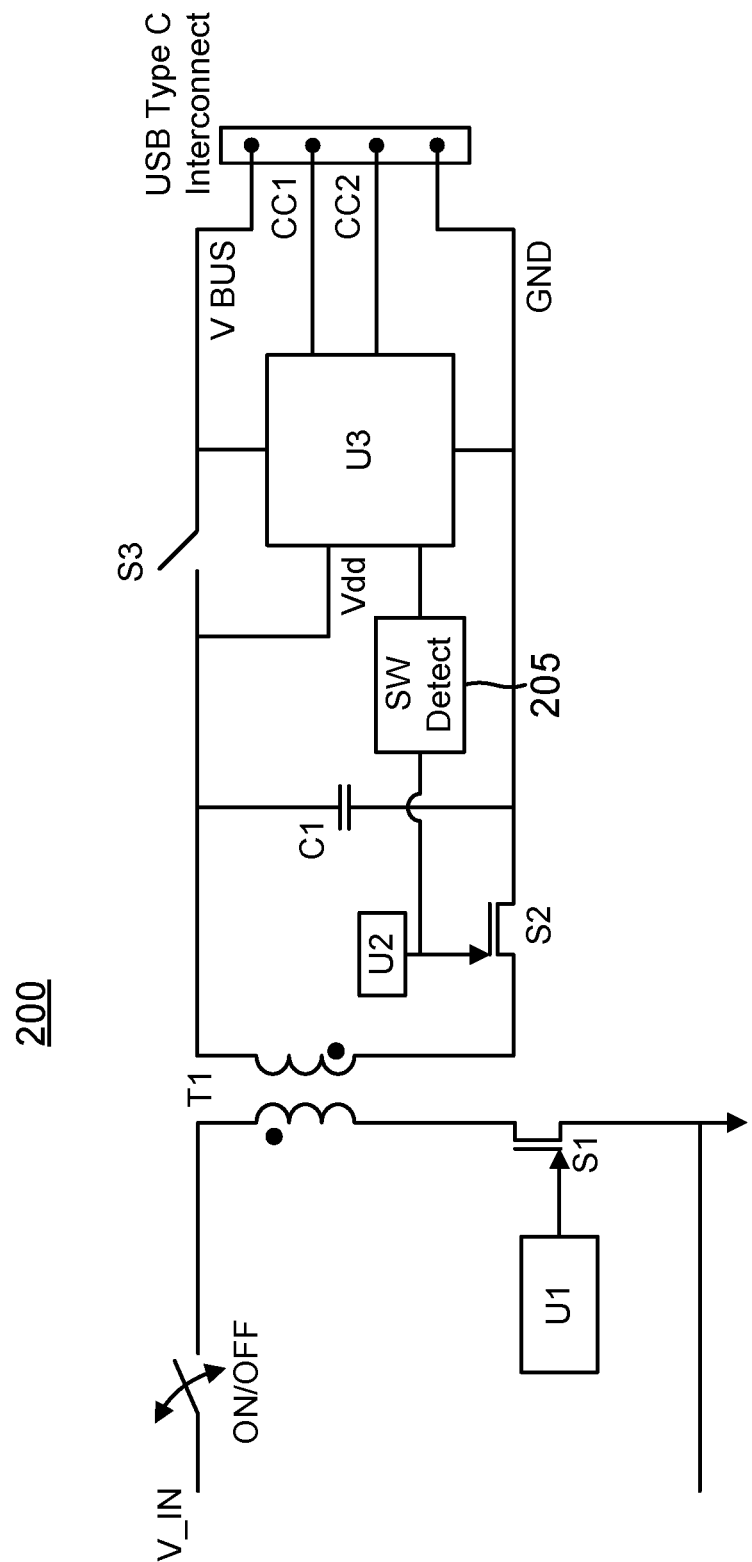
FIG. 2 is a diagram of a flyback converter configured to prevent battery discharge and damage during a direct charge mode of operation with synchronous rectification in accordance with an aspect of the disclosure.

An example flyback converter 200 is shown in FIG. 2. As discussed with regard to flyback converter 100, flyback converter 200 is configured to charge a mobile device (not illustrated) through a USB interface driving a USB cable (not illustrated). In the case of a USB type C interconnect, the USB interface includes a CC1 pin and a CC2 pin that are monitored by a secondary-side controller U3 for detecting whether the flyback converter 200 is connected over the USB cable to the mobile device. Flyback converter 200 includes a transformer T1 having a primary winding connected to a power switch transistor S1. A primary-side controller U1 controls the cycling of power switch transistor S1 to regulate the power deliver to mobile device 105. While the primary current flows through the power switch transistor S1, an SR switch transistor S2 is switched off by a synchronous rectifier controller U2 to prevent the secondary winding from conducting current. When the power switch transistor S1 is cycled off, synchronous rectifier controller U2 switches on SR switch transistor S2 so that the secondary winding current may flow to deliver power to the load.

The secondary winding drives a regulated output voltage rail 210 that connects through a voltage bus switch S3 to a Vbus pin or terminal in the USB interface for driving an output voltage onto a power bus lead within the USB cable. Voltage bus switch S3 may comprise a pair of switch transistors in series to prevent a reverse charge due to the body diode that would be present if just one switch transistor were used. The output voltage on regulated output voltage rail 210 is smoothed by an output capacitor C1. Secondary-side controller U3 includes a Vdd pin for receiving its power supply voltage Vdd by tapping off regulated output voltage rail 210. In addition, secondary-side controller U3 controls voltage bus switch S3 to isolate regulated output voltage rail 210 from the Vbus terminal when necessary as discussed further herein. During normal operation, voltage bus switch S3 is on so that power delivery can occur. As discussed earlier, battery discharge or damage can conventionally occur should flyback converter 200 charge a battery in the mobile device in a direct charging mode while flyback converter is isolated from an AC mains. In FIG. 2, this isolation occurs through the opening of a switch 215 but it will be appreciated that such a switch is conceptual in that the isolation would typically occur simply from a user unplugging flyback converter 200 from an AC mains. The resulting loss of input voltage from the AC mains causes power switch transistor S1 to stop cycling. But secondary-side controller U3 is isolated from the cycling of power switch transistor S1 through transformer T1. Flyback converter 200 thus includes a switch detection circuit 205 that monitors the switching of SR switch transistor S2. Switch detection circuit 205 thus uses the cycling of SR switch transistor S2 as a proxy for detecting whether power switch transistor S1 is cycling. Switch detection circuit 205 may be separate or may be integrated with secondary-side controller U3. Similarly, synchronous rectifier controller U2 may also be integrated with secondary-side controller U3. In response to a detection of no power switch cycling by switch detection circuit 205 while a mobile device is still connected over the USB cable to the USB interface, secondary-side controller U3 opens voltage bus switch S3. Secondary-side controller U3 thus comprises a logic circuit for responding to the detection by switch detection circuit 205 by switching open voltage bus switch S3. In this fashion, the conventional problems of battery discharge or damage during a direct charge mode of operation while the flyback converter is unplugged from the AC mains are solved.

An example switch detection circuit 205 is shown in more detail in FIG. 3. To detect whether the synchronous rectifier switch is being cycled, a comparator 300 compares the gate voltage (SR GATE) for the SR switch transistor S2 to a reference voltage (V_REF). For example, the gate voltage may be received at the non-inverting input for comparator 300 whereas the reference voltage may be received at the inverting input. The reference voltage is set to a mid-level voltage between ground and the binary-high value (e.g., the power supply voltage Vdd) for the gate voltage. Thus, when SR switch transistor S2 is cycled on, the comparator output signal will be asserted high whereas the comparator output signal is ground when the SR switch transistor SR is cycled off. The high state for the comparator output signal acts as a reset signal for a timer 305 that functions to filter out any transient interruptions in the power switch cycling. The output from the timer (designated as V_IN STATE) will switch its binary state in response to the timer timing out without being reset by the comparator output signal.

Figure 1:
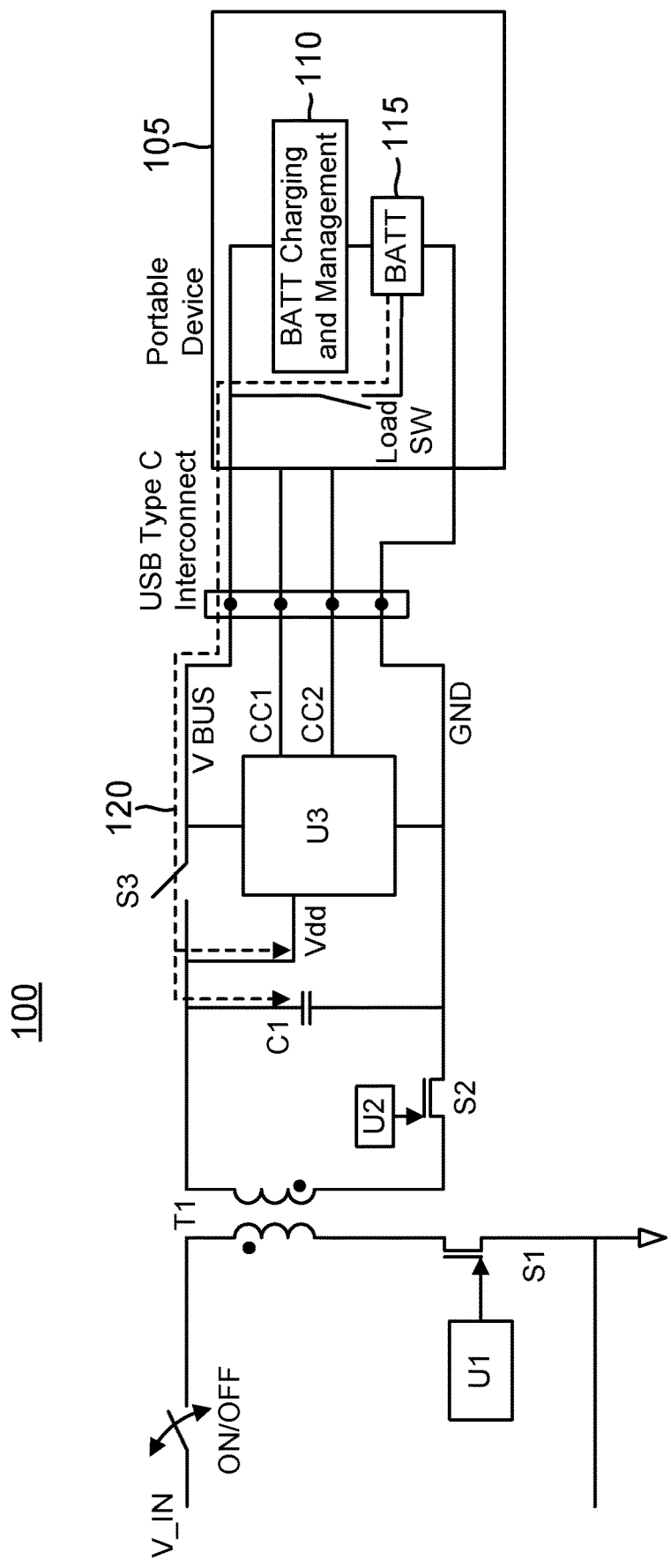
FIG. 1 is a diagram of a flyback converter and a mobile device in a conventional direct charging mode of operation.

An example waveform for the comparator output signal is shown in FIG. 4A. At a time t0, the SR switch transistor S2 stops cycling in response to a corresponding stop in the cycling of the power switch transistor S1. The timer output waveform is shown in FIG. 4B. At time t0, the timer is no longer reset by the comparator output signal such that it times out at a time t1. The duration of this time out period (timer length) is of sufficient duration to prevent damage to the battery without responding to noise or transients in the comparator output signal. In response to the timer timing out at time t1, the timer output signal changes its binary state. In FIG. 4B, the default state for the timer output signal is binary high such that it is active low with regard to detecting the lack of cycling of the power switch transistor S1. But it will be appreciated that the timer output signal may instead be active high in alternative embodiments. At a time t2, the comparator output signal begins to cycle again in response to a resumed cycling of the power switch transistor S1. The timer output signal thus goes back to its default high state at time t2. Referring back to FIG. 2, secondary-side controller U3 may be configured to notify the portable device of the opening of voltage bus switch S3. The portable device may thus open its load switch (FIG. 1) to leave the direct charge mode of operation. The portable device is thus protected from battery damage should the user reconnect flyback converter 200 to the AC mains such that the output current resumes at some default start-up current in response to the reestablishment of the input voltage and the corresponding reestablishment of the power supply voltage for the primary-side controller U1. The portable device may then resume a direct charge mode of operation once flyback converter 200 regulates its output current to a safe level.

Figure 5:
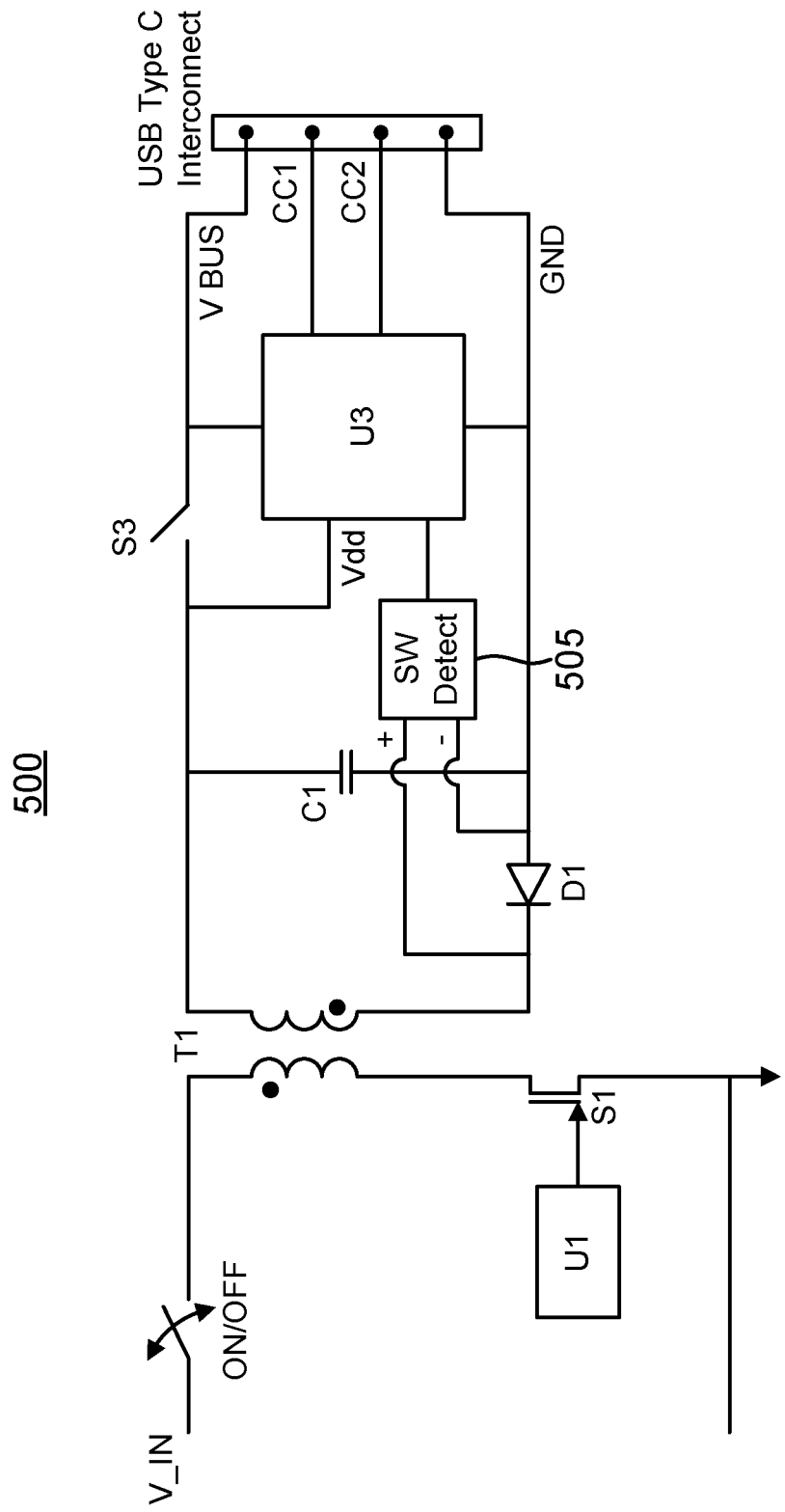
FIG. 5 is a diagram of a flyback converter configured to prevent battery discharge and damage during a direct charge mode of operation without synchronous rectification in accordance with an aspect of the disclosure.

It will be appreciated that the indirect sensing of the power switch transistor S1 cycling may be advantageously performed in flyback converters that do not practice synchronous rectification. An example flyback converter 500 without synchronous rectification is shown in FIG. 5. Primary-side controller U1, power switch transistor S1, transformer T1, output capacitor C1, voltage bus switch S3, secondary-side controller U3, and the USB interface are arranged as discussed with regard to flyback converter 200 of FIG. 2. An output diode D1 in series with the secondary winding functions becomes reverse biased while the power switch transistor S1 is on to prevent the secondary current from flowing. When the power switch transistor S1 switches off, the output diode D1 becomes forward biased to allow the secondary current to flow to deliver power to the load. A switch detection circuit 505 functions analogously as discussed with regard to switch detection circuit 205 to detect when the output diode D1 switches from being reverse biased to being forward biased and vice versa. For example, switch detection circuit 505 may include a comparator analogous to comparator 300 except that its non-inverting and inverting inputs are attached to the anode and cathode, respectively, of the output diode D1. Such a comparator will thus have an output signal that will be asserted when the output diode D1 is forward biased. In alternative embodiments, the comparator output signal may be de-asserted in response to such a forward bias. A timer analogous to timer 305 would then be reset by the comparator output signal accordingly. Secondary-side controller U3 (which comprises a logic circuit) responds as discussed with regard to flyback converter 200 by switching off voltage bus switch S3 in response to a detection that the power switch transistor S1 is no longer cycling while a mobile device is attached to the USB interface.

Note that the cathode voltage for output diode D1 can be used to detect the input voltage to the primary winding of the transformer T1 when the power switch transistor S1 is switched on. In particular, the cathode voltage equals a sum of the input voltage/N with the output voltage (Vbus voltage), where N is the primary-to-secondary turn ratio for transformer T1. Switch detection circuit 505 may thus be further configured to compare the cathode voltage for the output diode D1 while the power switch transistor S1 is conducting to a threshold value to determine whether the input voltage is too low (such as resulting from a brown-out condition on the AC mains). Secondary-side controller U3 may then respond to the brown-out detection by switching off voltage bus switch S3.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A secondary-side controller for a flyback converter, comprising:
   an output voltage terminal for an output voltage in a power lead within a data cable for powering a mobile device;
   a plurality of data terminals for coupling to corresponding data channels in the data cable;
   a switch detection circuit configured to sense a voltage of a rectifying circuit connected to a secondary winding of the flyback converter to determine whether a power switch transistor connected to a primary winding for the flyback converter has stopped cycling on and off, wherein the rectifying circuit is a synchronous rectifier switch transistor, and wherein the switch detection circuit comprises a comparator configured to compare a gate voltage of the synchronous rectifier switch transistor to a reference voltage and further comprises a timer configured to time a time-out period, and wherein the comparator is configured to reset the timer responsive to a cycling on of the synchronous rectifier switch transistor; and a logic circuit configured to switch off a voltage bus switch transistor to isolate the power lead from an output voltage rail in the flyback converter responsive to a detection through the plurality of data terminals that the mobile device is connected to the flyback converter through the data cable while the switch detection circuit senses that the power switch transistor has stopped cycling on and off.

2. The secondary-side controller of claim 1, wherein the data cable comprises a universal serial bus (USB) cable.

3. The secondary-side controller of claim 2, wherein the plurality of data terminals comprises a Configuration Channel 1 (CC1) terminal and a Configuration Channel 2 (CC2) terminal.

4. The secondary-side controller of claim 2, wherein the logic circuit is further configured to notify the mobile device through at least one of the data terminals that the voltage bus switch transistor has been switched off.

5. The secondary-side controller of claim 1, wherein the data cable comprises a universal serial bus (USB) cable.

6. The secondary-side controller of claim 5, wherein the plurality of data terminals comprises a Configuration Channel 1 (CC1) terminal and a Configuration Channel 2 (CC2) terminal.

7. The secondary-side controller of claim 5, wherein the logic circuit is further configured to notify the mobile device through at least one of the data terminals that the voltage bus switch transistor has been switched off.

8. A method, comprising:
while a flyback converter is attached to an AC mains, cycling on and off a power switch transistor attached to a primary winding of a transformer for the & flyback converter;
in a rectifying component attached to a secondary winding of the transformer, rectifying a secondary winding current to prevent the secondary winding current from flowing while the power switch transistor is on;
in response to a detachment of the flyback converter from the AC mains, ceasing the cycling of the power switch transistor;
detecting the ceasing of the cycling of the power switch transistor by comparing a gate voltage for a synchronous rectifier switch transistor to a threshold voltage to determine whether the synchronous rectifier switch transistor is cycling; and
switching off a voltage bus switch transistor to isolate a mobile device attached to the flyback converter through a data cable from an output voltage rail for the flyback converter responsive to a detection that the power switch transistor has ceased cycling.

9. The method of claim 8, wherein switching off the voltage bus switch transistor occurs responsive to a time-out period expiring following the detection that the power switch transistor has ceased cycling.

10. The method of claim 8, further comprising notifying the mobile device through a data channel in the data cable that the voltage bus switch transistor has been switched off.

11. A secondary-side controller for a flyback converter, comprising:
an output voltage terminal for an output voltage in a power lead within a data cable for powering a mobile device;
a plurality of data terminals for coupling to corresponding data channels in the data cable;
a switch detection circuit configured to sense a voltage of a rectifying circuit connected to a secondary winding of the flyback converter to determine whether a power switch transistor connected to a primary winding for the flyback converter has stopped cycling on and off, wherein the rectifying circuit is an output diode, and wherein the switch detection circuit comprises a comparator configured to compare a cathode voltage for the output diode to an anode voltage for the output diode; and
a logic circuit configured to switch off a voltage bus switch transistor to isolate the power lead from an output voltage rail in the flyback converter responsive to a detection through the plurality of data terminals that the mobile device is connected to the flyback converter through the data cable while the switch detection circuit senses that the power switch transistor has stopped cycling on and off.

12. The secondary-side controller of claim 11, wherein the switch detection circuit is further configured to compare the cathode voltage to a threshold voltage to detect whether an input voltage to the flyback converter has a brown-out condition, and wherein the logic circuit is further configured to switch off the voltage bus switch transistor responsive to a detection of the brown-out condition.

* * * * *